Sept. 6, 1955 J. J. KNASKO 2,716,998
COMBINED TIRE INFLATING CHUCK, DEFLATOR AND BLOW GUN
Filed March 2, 1949
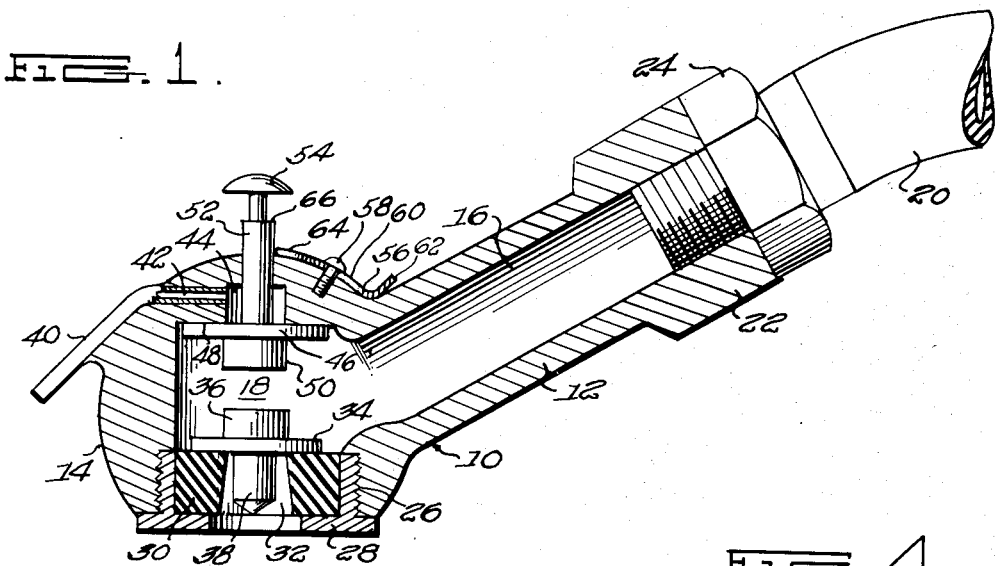
Inventor
JOSEPH J. KNASKO
By
Parker and Walsh
ATTORNEYS United States Patent Office 2,716,998
Patented Sept. 6, 1955

2,716,998

COMBINED TIRE INFLATING CHUCK, DEFLATOR AND BLOW GUN

Joseph J. Knasko, Ford City, Pa.

Application March 2, 1949, Serial No. 79,247

4 Claims. (Cl. 137—231)

The present invention relates generally to combined tire inflating chuck, deflator and blow gun.

More particularly, this invention relates to a combination air chuck and blow gun especially adapted for performing a number of related functions in connection with the servicing of pneumatic tires.

The invention to be hereinafter described in detail is probably best adapted for use in filling stations, garages and similar establishments in connection with the servicing and repair of pneumatic tires. As is well known to mechanics and others skilled in the art, the proper servicing of pneumatic tires usually necessitates the performance of a number of related operations, although in many cases, one or more of these operations may be omitted on account of inconvenience or the lack of time. For example, it is common knowledge that particles of dirt, grit or other abrasives are quite often deposited within the inner tube nipples around the valve stem, particularly when the valve caps have become lost while the tire is in service, and such particles sometimes cause tire failure or valve destruction if forced into the tire during inflation. This difficulty may be readily avoided by the simple expedient of utilizing air under pressure to blow around the valve stem prior to unseating the valve, but unfortunately, a blow gun capable of accomplishing this function is usually not conveniently available. Similarly, it is known that over-inflation of a pneumatic tire is highly undesirable, if not actually dangerous, but, here again, unless some small tool is at hand to accomplish partial deflation, the tire is frequently left in an over-inflated condition.

Accordingly, the principal object of the present invention is to provide a combination blow gun, air chuck, and tire deflater which will be readily available for tire servicing at all times, thereby providing a large measure of convenience and avoiding waste motion, and which is operable to perform its various related functions without the necessity for any modification of its parts or impairment of any function thereof.

Another object of the invention is to provide a combination tire-inflating device of the type described of simple and compact construction, embodying a relatively few working parts which may be inexpensively manufactured and which will require a minimum of maintenance in use.

A further object of the invention is to provide a tire-inflating device of the type described, embodying a pair of air flow control valves which may be either separately or jointly actuated for the performance of either separate or cooperative functions and wherein both valves are pressure-sealing to avoid leakage.

The foregoing, as well as other and further objects and advantages of the present invention, together with a clearer understanding of the exact nature thereof, will become more readily apparent to one skilled in the art from a consideration of the following detailed specification taken in conjunction with the accompanying drawings, wherein:

Figure 1 is a longitudinal cross-sectional view in the vertical plane taken through a preferred form of tire inflation device in accordance with the present invention;

Figure 2 is a front elevational view of the tire inflation device of Figure 1;

Figure 3 is a longitudinal cross-sectional view similar to Figure 1, but illustrating a modified form of tire inflation device in accordance with the present invention; and Figure 4 is a longitudinal cross-sectional view similar to Figures 1 and 3, but illustrating still another modified form of tire inflation device in accordance with the present invention.

Referring now in somewhat greater detail to the various figures of the drawing and particularly to Figures 1 and 2 thereof, there is illustrated a preferred form of apparatus for inflating pneumatic tires which is seen to comprise a hollow valve body designated generally by reference numeral 10. This valve body is preferably somewhat elbow shaped and includes a tubular portion 12 and a rather bulbous-shaped main body portion 14 formed integrally therewith. As mentioned above, substantially the entire valve body is hollow, and it will be noted that the tubular portion 12 is provided with an interior space or passage 16 and the main body portion 14 is likewise provided with an interior chamber 18 in communication with the passage 16. The tubular portion 12 of the valve body is adapted to be attached at one end in any convenient manner to an air pressure line or hose 20, a fragment of which is illustrated in Figure 1, and for this purpose, the outer end of the tubular portion 12 is suitably squared or faced as indicated by reference numeral 22 and internally threaded for engagement with a male pressure fitting designated by reference numeral 24 and secured in any convenient manner to the end of the air line 20.

As shown particularly in Figure 1, the bulbous main body portion 14 is generally in the shape of a truncated sphere wherein the truncation is effected by means of a generally horizontal plane passing through the lower portion thereof. The interior of the main body portion 14 adjacent the truncation is provided with a threaded counter bore designated by reference numeral 26, giving access to the hollow interior space 18. The aperture thus provided in the lower surface of the main body portion 14 is partially closed by means of a shouldered retaining ring 28 suitably threaded for engagement with the threaded counter bore 26 and serving to retain within the aperture an annular valve washer 30 of a suitable resilient material. The central opening of the valve washer 30 is preferably tapered inwardly and upwardly to provide a pressure seal around a tire nipple (not shown) when the latter is inserted for inflation, and it will be apparent that the structure thus provided constitutes a generally conventional air chuck having a tapered nipple receiving passage 32.

Referring again to Figure 1, it will be noted that the passage 32 is normally obturated by means of a disc valve 34 which forms a pressure seal against the inner face of the annular valve washer 30. The disc valve 34 is provided with an abutment 36 formed on its inner face and extending upwardly into the interior space 18 for a purpose which will hereinafter be more fully set forth. The lower or outer face of the disc valve 34 is provided with a boss 38 projecting downwardly therefrom and into the passage or aperture 32. As will be readily apparent, the boss 38 is adapted to engage the valve stem within a tire nipple when the latter is inserted into the aperture 32, thereby unseating both the tire valve and the disc valve 34 to permit air under pressure to flow from the air line 20 through the interior spaces 16 and 18 of the valve body and into the tire nipple.

Still referring to Figure 1, it will be noted that the upper front portion of the main body 14 is provided with a relatively small tubular nozzle designated by reference numeral 40, and preferably formed integrally therewith. The nozzle 40 is connected by means of a transverse bore 42 and chamber 44 to the interior space 18, although normally, the chamber 44, and thus the opening to the nozzle 40, is obturated by means of a disc valve 46 which seats upwardly against the top 48 of the chamber 18 around the chamber 44. The inner face of the disc valve 46 is provided with an abutment 50 similar to the abutment 36 on the valve 34 and, like the latter, projecting inwardly into the chamber 18. The outer face of the disc valve 46 is provided with a valve-operating push rod 52 extending upwardly through a suitable bore formed in the top of the main body portion 14 and having a button or the like 54 on its top end.

It will now be apparent that if the valve body is grasped in the hand of an operator and the valve-operating push rod 52 depressed by pressing the thumb or other finger against the button 54, the disc valve 46 will be unseated, thus permitting air under pressure to flow from the air line 20 through the passages 16, 18, 44 and 42 into the nozzle 40, from which it issues in the form of a pressure jet. It will also now be apparent that both of the disc valves 34 and 46 are pressure-sealing, that is, the air pressure within the chamber 18 tends to force both valves outwardly against their seats so that they will normally remain seated, and if temporarily unseated, the natural pressure forces will tend to return them to their respective seats as soon as the unseating force is removed.

In the event it is desired to retain the valve 46 in the unseated or open position for a considerable period of time, I have provided suitable detent apparatus which may be actuated in such manner that it will be unnecessary to retain finger pressure against the button 54 and push rod 52. As shown in Figure 1, this detent structure includes a curved plate 56 slidably mounted upon the top of the main body portion 14 of the valve housing 10 as by means of a bolt 58 extending through a suitable slot 60 formed in the central portion of the plate 56. One end of the plate 56 is upturned as indicated at 62 to provide a rim or lip for operating the detent, and at its other end, the plate 56 is bifurcated to form a clevis or yoke 64 engageable with a shoulder 66 formed on the push rod 52. It will be apparent that when the push rod 52 has been moved downwardly a sufficient distance to unseat the valve 46, the plate 56 may be slid by means of the lip 62 in such manner as to cause the clevis 64 to engage the shoulder 66, thereby preventing outward movement of the push rod 52 as well as closing of the valve 46.

During normal operation of the tire inflating apparatus described above, it is usually desirable for the operator to open the valve 46 by pressing the button 54 momentarily to permit a jet of air under pressure to be discharged from the nozzle 40 in order to blow away any foreign particles which may be present within the inner tube nipple of the tire being inflated. As soon as the tire nipple has thus been cleaned of any impurities which may surround the tire valve stem, the tire nipple may be inserted into the tapered aperture 32. During inflation, the washer 30 will seal about the outer periphery of the tire nipple, while the valve 34 will be unseated, as will the inner tube valve, by engagement of the boss 38 with the tire valve stem in the manner previously described. If for any reason the tire should be or become over-inflated, it is a relatively simple matter to let some air out of the tire by using the outer end of the nozzle 40 to press down the tire valve stem, thereby unseating the tire valve and permitting the desired amount of air to escape from the inner tube.

It will be noted that if either of the valves 34 or 46 is unseated, the abutments 36 and 50, respectively, tend to move inwardly into the chamber 18, thus serving to limit the permissible extent of opening of these valves. Another cooperative relationship between the valves 34 and 46 is established by the joint operation of both valves during a tire-inflating operation. For example, if it is found during tire inflation that air is flowing too rapidly into the tire, it is possible to depress the push rod 52, thereby permitting a portion of the air under pressure within the chamber 18 to escape to the atmosphere through the nozzle 40. In effect, theerfore, it is possible to regulate the amount of opening of the valve 46 in such manner as to regulate the effective pressure within the chamber 18 and thereby control the rate at which a tire will be inflated.

Referring now particularly to Figure 3, there is illustrated a modified form of my improved device wherein practically all of the basic structure is substantially identical with that previously described and illustrated in Figure 1. As shown in Figure 3, however, the valves 34b and 46b are in the form of shallow cups having upturned rims 68 and 70, respectively, which take the place of the abutments 36 and 50 in serving to limit the permissible amount of opening movement of the valves. It will also be noted in this figure that I have provided a helical spring 72 which is interposed between the valves 34b and 46b under compression in such manner as to bias said valves towards closed position.

The further modified form of my improved device as illustrated in Figure 4 is again quite similar in substantially all respects to the two forms previously described. However, in this modification, it will be noted that in addition to providing the compression spring 72a, as shown in Figure 3, there is also provided a different type of boss (36a—50a) for limiting the amount of opening movement of the valves. In the device of Figure 4, it will be noted that the boss 36a on the valve 34a is provided with an internally threaded bore 74, whereas the boss extending inwardly from the valve 46a is considerably reduced in cross-section and is provided with threads 76 engageable within the threaded bore 74. In addition to serving the function heretofore described, the bosses in the device of Figure 4 may also be threadedly engaged by rotation of the push rod 52a or button 54 after the latter have been slightly depressed, thereby serving to retain the valve 46a in open position. This threaded engagement between the valve bosses thus takes the place of the detent plate 56 of Figure 1 in serving to hold the valve 46 open for extended periods of operation.

Although I have referred throughout the specification to certain elements of my improved device as being integrally formed, it will be apparent to one skilled in the art that conventional fabrication processes may be employed in manufacture and that the various elements may be separately produced and later assembled together. Furthermore, it will be clear that while my improved device is preferably constructed from the beginning as an integral assembly, it is contemplated that the various modifications involved may be applied to existing air chucks of conventional type now in use. In any case, it will be observed that my improved tire inflation device provides in a simple unitary construction having a minimum number of working parts, a readily available tool for complete tire servicing. Since both valves are pressure-sealing from the interior, it is worth noting that no exterior packings or the like are required, as, for example, around the valve operating push rod 52.

Obviously, numerous modifications, alterations, and deviations from the specific structures disclosed herein as preferred embodiments solely for the purpose of illustration, will occur to one skilled in the art without departing from the principles of the invention. Also, while only three preferred embodiments of the invention have been described in detail, it is to be understood that numerous changes can be made in size, materials, and arrangement of parts without departing from the principles of the invention as set forth in the appended claims.

Having thus described my invention, what I claim as novel and desire to secure by Letters Patent of the United States is:

1. Apparatus of the character described comprising a body having an internal chamber and a laterally extending duct in communication with the chamber and adapted for connection to an air pressure line, said body at one side of said chamber having a threaded opening larger in diameter than said chamber, a retaining ring threaded in such opening, a resilient washer within said retaining ring having an axial opening therethrough, a valve normally seated against the inner surface of said washer and provided with an axial projecting valve depresser in the opening in said washer, a valve seat in said body at the other side of said chamber, a second valve engaging said valve seat, there being a space in said body adjacent said second valve normally closed by such valve to communication with said chamber, said body being provided with a laterally extending passage communicating with said space, and a valve stem carried by said second valve in axial alignment therewith and projecting through the side of said body opposite said threaded opening for operation of said second valve, said valves and said washer being smaller in diameter than said chamber and said threaded opening whereby such valves and washer are insertable into position through such threaded opening.

2. Apparatus of the character described comprising a body having an internal chamber and a laterally extending duct in communication with the chamber and adapted for connection to an air pressure line, said body at one side of said chamber having an opening, an annular valve washer in said opening, a retaining ring releasably engaged with said body for retaining said washer in said aperture, a valve normally seated against the inner surface of said washer and provided with a projecting valve depresser in the opening of said washer, means forming a valve seat in said body at the other side of said chamber, said body providing a space adjacent said valve seat and a laterally extending passage communicating with said space, a second valve engaging said valve seat and normally closing such space to communication with said chamber, and a valve stem carried by said second valve and projecting from said body opposite said threaded opening for manual operation of said second valve, said valves and said washer being smaller in diameter than said chamber and said opening whereby they are insertable into position in said chamber through such opening.

3. Apparatus for inflating pneumatic tires comprising, in combination, a hollow valve body having a tubular portion adapted to be connected at one end to an air pressure line and a bulbous main body portion in interior communication with said first mentioned portion, said main body portion having an aperture at one side thereof, an annular valve washer in said aperture, a shouldered retaining ring releasably engaged with said main body portion for retaining said washer in said aperture, a valve normally seated against the inner surface of said washer and provided with a projecting valve depresser in the opening in said washer, means forming a valve seat in said body at the opposite side thereof and a passage adjacent said seat communicating with the exterior of the valve body, a second valve engaging said valve seat and normally closing said passage to communication with the interior of the valve body, and a valve stem carried by said second valve and projecting from said body for manual operation of said second valve, said valves and said washer being smaller in diameter than said aperture whereby they are insertable into position in said body through such aperture.

4. Apparatus of the type set forth in claim 3 wherein said valves comprise disc valves disposed for opening movement toward each other, said valves having portions adapted for interengagement to limit such opening movement thereof.

References Cited in the file of this patent

UNITED STATES PATENTS

| Number | Name | Date |
|---|---|---|
| 1,385,160 | Stokes | July 19, 1921 |
| 1,522,369 | Jaden | Jan. 6, 1925 |
| 1,581,007 | McFarland | Apr. 13, 1926 |
| 1,781,121 | McFarland | Nov. 11, 1930 |
| 1,794,703 | Methudy | Mar. 3, 1931 |
| 1,815,533 | Vincent | July 21, 1931 |
| 2,124,937 | Whittle | July 26, 1938 |
| 2,138,988 | Thomas | Dec. 6, 1938 |
| 2,173,619 | Ames | Sept. 19, 1939 |
| 2,306,469 | Rupley | Dec. 29, 1942 |
| 2,344,492 | Brubaker | Mar. 21, 1944 |

FOREIGN PATENTS

| Number | Country | Date |
|---|---|---|
| 475,891 | Great Britain | Nov. 29, 1937 |
| 532,760 | Great Britain | Jan. 30, 1941 |